(12) United States Patent
Ross et al.

(10) Patent No.: US 6,586,760 B1
(45) Date of Patent: Jul. 1, 2003

(54) WATER LEVEL MEASURING METHOD AND SYSTEM

(75) Inventors: Jerry Hubert Ross, Waveland, MS (US); Eugene Clark Hayes, Diamondhead, MS (US); Michael George Zalants, Mandeville, LA (US)

(73) Assignee: The United States of America as represented by the Secretary of the Interior, Washington, DC (US)

( * ) Notice: Subject to any disclaimer, the term of this patent is extended or adjusted under 35 U.S.C. 154(b) by 0 days.

(21) Appl. No.: 09/433,074

(22) Filed: Nov. 3, 1999

(51) Int. Cl.$^7$ ................................................ G01N 21/85
(52) U.S. Cl. ......................... 250/577; 250/573; 73/293
(58) Field of Search ................................ 250/573–577, 250/201.1, 234–236; 356/249–255, 436, 440, 3.02; 33/377, 366.23; 73/293, 1.73; 340/612, 618, 619

(56) References Cited

U.S. PATENT DOCUMENTS 4,524,282 A * 6/1985 King .......................... 250/577
5,973,770 A * 10/1999 Carter et al. ................ 356/4.09

* cited by examiner

Primary Examiner—Que T. Le
Assistant Examiner—Thanh X. Luu
(74) Attorney, Agent, or Firm—Ross F. Hunt, Jr.

(57) ABSTRACT

A method and system are provided for determining the level of a body of water, whether free flowing or stationary. Positionable mirrors are located at an area adjacent to but spaced from the body of water. The mirrors direct a laser beam at an angle to true vertical onto the surface of the body of water such that a portion of the beam is reflected from the surface. A receiver is located at a known distance from the mirrors on the opposite side of the body of water and in a common horizontal plane. The receiver receives a reflected laser beam and redirects the beam to a signal detector. A controller for the mirrors determines the angle to true vertical at which the mirrors are set after receiving an output from the signal detector. A simple calculation, based on the determined angle and the known distance between the mirrors and the receiver is then made of the distance from the common horizontal plane to the water surface so as to determine the water level.

15 Claims, 1 Drawing Sheet

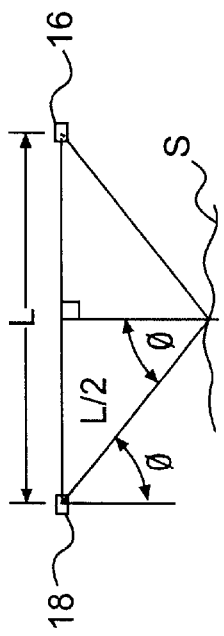
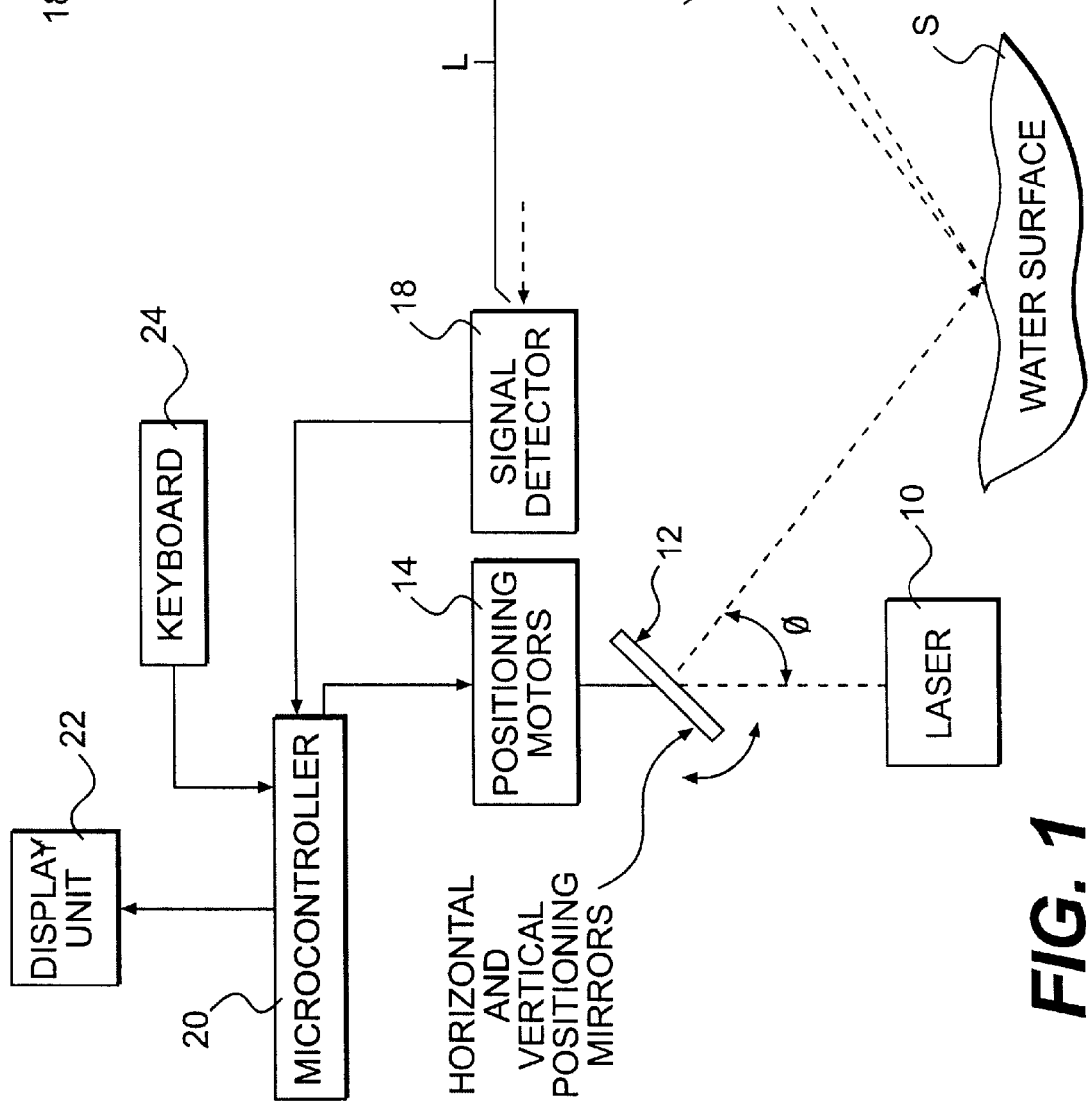

US 6,586,760 B1

WATER LEVEL MEASURING METHOD AND SYSTEM

CROSS REFERENCE TO RELATED APPLICATION

This application discloses subject matter related to out concurrently filed, copending application Ser. No. 09/433, 075, entitled METHOD AND APPARATUS FOR WATER LEVEL DETERMINATION.

FIELD OF THE INVENTION

The present invention relates to methods and systems for measuring the water level of a body of water, whether free flowing water such as a river or stream or stationary such as a lake, reservoir or holding tank, and, more particularly, to an improved water level measuring method and system which does not involve mounting of the measurement equipment over the water surface, i.e., which enables water level measurements to be made from the edge of the water, e.g., from an embankment, platform or bridge structure adjacent to the water.

BACKGROUND OF THE INVENTION

Both mechanical and electromechanical devices are used to measure what is referred to as "stage" or water level with respect to a datum point. This is generally done from a bridge platform or structure in or over the water. Such water level measuring devices require that the sensor be in contact with water surface and in the majority of instances, require a specially built housing or enclosure, referred to as a stilling-well installation, to dampen or filter the turbulence of water in order to obtain a correct reading. Such stilling-well installations generally employ a long, typically two-foot diameter corrugated pipe attached vertically to an adjacent platform, and extending all of the way into a water column. All water level measurement instruments currently used by the United States Geological Survey (USGS) use the contact methods in determining water level and water flow, and, in this regard, there are nearly 7,000 sites throughout the United States which contain equipment or instruments for measuring water level.

With some devices, it is difficult to obtain a measurement of water level because of the lack of a platform or other structure for mounting the measuring equipment or instrument. Further, because the placement of such structures in parks and wildlife refuges detracts from the natural beauty of the environment, the structures are often located at sites which are out of the way and difficult to get to, and substantial time and expense is incurred in transporting personnel to visit, and make measurements at, these largely inaccessible sites. Moreover, there are many areas for which water level information is needed but cannot be obtained because of the cost and manpower necessary to prepare a site for installation of equipment. Further, because at least with USGS installations, a majority of the stage measuring instruments are mounted on bridge platforms, the installation of the instruments and extraction of the data can be hazardous.

Some prior art commercial systems use measuring or sensing beams and require that the sensing or measuring beam (which may be a radar beam or laser beam) be mounted such that the beam projects directly vertically downward to the water surface. Further, the characteristics of the measuring beam itself (e.g., whether in pulsed mode or continuous mode of operation) are employed in making the measurement, and this can often complicate the associated electronic circuitry required. In such systems, beam characteristics such as time-of-flight or change in phase are used in determining the water level, in contrast to the present invention which, as explained below, uses simple geometry in calculating the water level.

SUMMARY OF THE INVENTION

In accordance with the invention, a method and system are provided for the determination of the water level of both free flowing bodies of water (e.g., rivers or streams) and stationary bodies of water (e.g., lakes, reservoirs or holding tanks), which overcome or substantially eliminate the above-discussed problems associated with prior art methods and devices.

Among other important advantages thereof, the invention does not require the system apparatus be positioned vertically above the water surfaces, i.e., the apparatus need not be mounted on a structure (bridge or platform) which is located over or across the water but instead can be sited and operated at the edge of the body of water. Further, the invention can be used in measuring water levels in canyons, from bluffs and in highly inaccessible areas wherein a conventional water level measurement device would normally be positioned directly vertical with respect to the water surface. Further, as indicated below, the invention makes water level measurements based on simple geometry, i.e., uses no electronic or electromechanical or mechanical contact of a sensor with the water surface, and thus eliminates the problems associated with contact systems, such as damage to the sensor caused by floating or submerged objects in free flowing water. In addition, installation of the invention at new sites, which is done periodically by the USGS, can be carried out with substantial cost savings, because, inter alia, there is no need for stilling wells.

In accordance with one aspect of the invention, a system is provided for determining the level of a body of water, whether free flowing or stationary, the system comprising: at least one positionable reflective element located at an area adjacent to, but spaced from, the body of water, for directing a laser beam at an angle to true vertical onto the surface of the body of water such that at least a portion of the directed beam is reflected from the surface; a signal detector for producing an output in response to receiving a laser beam; a receiver, located at a determined distance from the reflective element on the opposite side of the body of water from the reflective element and in a common horizontal plane with the reflective element, for receiving the reflected laser beam and redirecting the beam to said signal detector; and a controller for controlling positioning of the positionable reflective element at a determined angle to true vertical at which the reflected beam is received by the receiver, for receiving said output from the signal detector, and for calculating, based on said determined angle and the determined distance between the reflective element and the receiver, the distance from the common horizontal plane to the water surface so as to determine the water level.

Preferably, the at least one reflective element comprises first and second mirrors for reflecting the laser beam along two orthogonal axes. Advantageously, the first and second mirrors comprise vertical and horizontal positioning mirrors. The system preferably further comprises positioning motors controlled by the controller for controlling the positioning of the mirrors. Advantageously, the positioning motors comprise stepping motor or voltage controlled motors.

In a preferred embodiment, the system further comprises input means for inputting data to the controller. The input means advantageously comprises a keyboard. In addition, a display unit is preferably provided for displaying the determined water level and other data.

The receiver advantageously comprises receiver optics for receiving the reflected beam and at least one corner prism for redirecting the beam to the signal detector.

In accordance with a further aspect of the invention, a method is provided for determining the level of a body of water, whether free flowing or stationary, the method comprising: directing a laser beam at a variable angle to true vertical from a positionable reflective element, located at an area adjacent to but spaced from the body of water, onto the surface of the body of water such that at least a portion of the beam is reflected from the surface; receiving the portion of the beam reflected from the surface with a receiver located on the opposite side of the body of water from, and in substantially the same horizontal plane as, the reflective element, and redirecting the reflected beam so received to a signal detector for producing an output signaling reception of the redirected reflected beam; determining the angle to true vertical at which the portion of the reflected beam is received by said receiver responsive to receiving said output from the signal detector; and using (i) the angle to true vertical so determined, and (ii) the distance between the reflective element and the receiver, to calculate the distance from said horizontal plane to the water surface so as to determine the water level.

Preferably, the laser beam is dithered and a plurality of angle data points are taken in determining the angle to true vertical.

In a preferred embodiment, the reflective element comprises horizontal and vertical positionable mirrors and the method further comprises controlling the positions of the mirrors in determining the angle to true vertical. Preferably, the angle of the mirrors is initially set by a microcontroller at a predetermined angle (e.g., 0°) with respect to true vertical and the angle of the mirrors is thereafter increased by the microcontroller until the reflected beam is received by the receiver. Advantageously, the signal detector signals the microcontroller when the reflected beam is received by the receiver and the microcontroller then determines the current angles of the mirrors. In one advantageous implementation, the signal detector is located in close proximity to the microcontroller and is electrically connected to the microcontroller.

Further features and advantages of the present invention will be set forth in, or apparent from, the detailed description of preferred embodiments thereof which follows.

BRIEF DESCRIPTION OF THE DRAWINGS

FIG. 1 is a block diagram of a water level measurement system in accordance with a preferred embodiment of the invention; and FIG. 2 is a geometrical diagram used in explaining the calculations used in the method of the invention.

DESCRIPTION OF THE PREFERRED EMBODIMENTS

Referring to FIG. 1 of the drawings, a block diagram is shown of a water level measuring system in accordance with a preferred embodiment of the invention. The system includes a laser 10 which produces or emits an infrared beam onto a pair of reflecting positioning mirrors indicated schematically at 12. Laser 10 can operate in either a pulsed or continuous mode. Preferably, the mirrors 12 are, respectively, horizontally and vertically oriented, and are used to direct the laser beam reflected therefrom in two axes of pointing direction, i.e., along the X and Y axes or in horizontal or vertical directions so as to enable focusing of the beam on a distant target in two axes. The mirrors 12 are controlled by respective positioning motors 14.

The laser beam, as reflected by mirrors 12, is directed at angle φ from the vertical plane to the water surface, which is denoted S in the drawings. The trajectory of the beam is chosen such that a portion of the beam is reflected off of the water surface S at the same angle as the angle of incidence, and received by receiving optics 16. The beam is dithered as indicated by arrows BD for purposes described below. As indicated in the drawings, the receiving optics 16 redirects the beam back over the water surface, and comprises a receiving lens 16a, a collimating lens 16b, and a pair of corner reflecting prisms 16c and 16d. However, it will be understood that any system of optical elements that is capable of receiving the portion of the reflected beam reflected from the water surface and redirecting a beam back across the water can be employed.

The redirected beam is received by a signal detector 18 after traveling over a known fixed distance L (i.e., the distance between receiver optics 16 and signal detector 18 is fixed and is known or previously determined). Signal detector 18 is located in close proximity to positioning mirrors 12 and on approximately the same horizontal plane as the reflected beam from mirrors 12, and thus the laser beam, over the complete course of its travel, essentially forms a triangle. The angle φ between the beam reflected from the positioning mirrors 12 and true vertical is known and, by knowing this angle, and the distance L, the distance to the water surface S can be readily calculated using simple geometry. In this regard, the distance between the positioning mirrors and the receiver optics is equal to L (plus the very small, essentially negligible, distance between mirrors 12 and signal detector 18) and, as shown in FIG. 2, one-half of this distance forms one side of the right triangle, the other side of which is the distance from the aforesaid horizontal plane to the water surface S. Thus by knowing the angle φ and the fixed distance L, the distance to the water level or water surface can be readily calculated using simple trigonometry.

A microcontroller 20 is connected to positioning motors 14 and signal detector 18 and performs several functions or operations. The principle function is control of the horizontal and vertical positions of the positioning mirrors 12 by controlling positioning motors 14. In a preferred embodiment, the positioning motors 14 each comprise a stepping motor or direct control voltage galvanometers while the mirrors 12 each comprise a small optically reflecting mirror attached to the shaft of the corresponding motor. Microcontroller 20 controls stepping of the motors 14 or otherwise controls the operation thereof so that the corresponding angular positions of mirrors 12 is known. A display unit 22 is connected to microcontroller 20 and displays information to the system operator while a keyboard 24 (or a switching array or other input device) is connected to microcontroller 20 so as to provide inputting of operator control functions and settings. The connection between microcontroller 20 and signal detector 18 enables the microcontroller 20 to be informed of the detection of the reflected or returning beam.

It is noted that the laser beam need have no special characteristics in performing the water level measurement other than being detectable by signal detector 18. If necessary, depending on the application or the circumstances or for extremely long separation distances, the signal detector 18 can be located at the receiver optics 16.

Although the operation of the system of the invention is believed to be evident from the foregoing, this operation will now be reviewed in somewhat more detail. The microcontroller 20 first beings the operation or process with the positions of the mirrors 12 at an angle of approximately 0° with respect to true vertical. The microcontroller 20 then begins to increase the angle φ until the reflected portion of the beam is detected by the receiving optics 16 and thus by the signal detector 18 which signals this fact to the microcontroller 20. In order to account for water surface roughness, the microcontroller 20, upon receiving a signal that the reflected beam has been detected by signal detector 18, will provide dithering of the angle φ of the laser beam (as indicated at BD) about the detected angle so that sufficient angle data points are acquired to enable a determination to be made of the correct angle. It will be appreciated that the more samples of the angle that are taken (or the greater the number of hits recorded), the more confidence there will be in the determination of the angle and thus in the computation of the water level.

It will be appreciated from the foregoing that the invention provides a number of important advantages over the prior art. For example, the invention does not rely on detecting beam characteristics, such as time-of-flight or change in phase, in performing the water level measurement. In contrast, the laser beam is itself used to determine a straight line plumb and simple geometry is employed to determine the water level. Further, the device or system of the invention does not require mounting directly over and vertical to the water surface in order to make the necessary measurements. As will be evident, the system of the invention can be mounted on a river bank or atop a canyon wall and no bridge structure is required for supporting or mounting the system. In addition, the invention does not require fabrication and installation of a special platform or piling structure or the construction of a stilling well as discussed above. Still further, the invention performs measurements in a non-contact manner, i.e., no portion of the sensor is in contact with the water, and thereby avoids the problems associated with contact sensors described hereinbefore.

Although the invention has been described above in relation to preferred embodiments thereof, it will be understood by those skilled in the art that variations and modifications can be effected in these preferred embodiments without departing from the scope and spirit of the invention.

What is claimed is:

1. A system for determining the level of a body of water, whether free flowing or stationary, said system comprising:
    at least one positionable reflective element located at an area adjacent to but spaced from the body of water, for directing a laser beam at an angle to true vertical onto the surface of the body of water such that at least a portion of the directed beam is reflected from the surface to produce a reflected laser beam;
    a motor including a motor shaft for controlling positioning of said at least one positionable reflective element;
    a laser signal detector;
    a receiver, located at a determined distance from the at least one positionable reflective element on the opposite side of the body of water from said at least one positionable reflective element and in a common horizontal plane with the at least one positionable reflective element, for receiving the reflected laser beam and redirecting the reflected laser beam to said signal detector so that said signal detector produces an output; and
    a controller for controlling said motor to control positioning of said at least one positionable reflective element at an angle to true vertical, for receiving said output from said signal detector, for detecting motor shaft position and determining, based thereon, and on said output of said signal detector, a determined angle to the true vertical at which said at least one positionable reflective element is positioned when said reflected laser beam is received by said receiver, and for calculating, based on said determined angle and the determined distance between the at least one positionable reflective element and the receiver, the distance from the common horizontal plane to the water surface so as to determine the water level.

2. A system as claimed in claim 1 wherein said at least one positionable reflective element comprises first and second mirrors for reflecting said laser beam along two orthogonal axes.

3. A system as claimed in claim 2 wherein said first and second mirrors comprise verticle and horizontal positioning mirrors.

4. A system as claimed in claim 2 wherein said motor comprises first and second positioning motors controlled by said controller for controlling the positioning of said mirrors.

5. A system as claimed in claim 4 wherein said positioning motors comprise stepping or direct current (DC) voltage motors.

6. A system as claimed in claim 4 further comprising input means for inputting data to said controller.

7. A system as claimed in claim 6 wherein said input means comprises a keyboard.

8. A system as claimed in claim 4 further comprising a display unit for displaying the determined water level.

9. A system as claimed in claim 4 wherein said receiver comprises receiver optics for receiving the reflected beam and at least one corner prism for redirecting the beam to the signal detector.

10. A method for determining the level of a body of water, whether free flowing or stationary, said method comprising:
    controlling a laser positionable by rotation of a motor shaft to direct a laser beam at a variable angle to true vertical from a positionable reflective element, located at an area adjacent to but spaced from the body of water, onto the surface of the body of water such that at least a portion of the beam is reflected from the surface;
    receiving the portion of the beam reflected from the surface with a receiver located on the opposite side of the body of water from, and in substantially the same horizontal plane as, said reflective element, and redirecting the reflected beam portion so received to a signal detector for producing an output signaling reception of the redirected reflected beam;
    determining the angle to true vertical at which the portion of the reflected beam is received by said receiver responsive to receiving said output from said signal detector based on the amount of motor shaft rotation which has occurred when said output signal is received; and
    using (i) the angle to true vertical so determined and (ii) the distance between the reflective element and the receiver to calculate the distance from said horizontal plane to the water surface so as to determine the water level.

11. A method as claimed in claim 10 wherein said beam is dithered and a plurality of angle data points are taken in determining the angle to true vertical.

12. A method as claimed in claim 10 wherein said reflective element comprises horizontal and vertical positionable mirrors and said method further comprising controlling the positions of said mirrors in determining said angle to true vertical.

13. A method as claimed in claim 12 wherein the positions of the mirrors is initially set by a microcontroller at a predetermined angle with respect to true vertical and said angle is thereafter increased by the microcontroller until the reflected beam is received by the receiver.

14. A method as claimed in claim 13 wherein the signal detector signals the microcontroller when the reflected beam is received by said receiver and the microcontroller then determines the current angles of the mirrors.

15. A method as claimed in claim 14 wherein the signal detector is located in close proximity to said microcontroller and is electrically connected to said microcontroller.

* * * * *